United States Patent [19]

Mattera et al.

[11] Patent Number: 5,023,801
[45] Date of Patent: Jun. 11, 1991

[54] PROGRAMMABLE - VOLTAGE - GENERATOR INTERFACE FOR DECREASING THE MINIMUM VOLTAGE STEP

[75] Inventors: Adriano Mattera, Novara; Roberto Fornari, Parma; Renato Magnanini, Reggio Emilia; Carolo Paorici, Parma; Lucio Zanotti, Via S. Pellico; Giovanni Zuccalli, Parma, all of Italy

[73] Assignees: Montedison S.p.A., Milan; Consiglo Nazionale Delle Ricerche, Rome, both of Italy

[21] Appl. No.: 323,172

[22] Filed: Mar. 15, 1989

Related U.S. Application Data

[63] Continuation of Ser. No. 867,024, May 27, 1986, abandoned.

[30] Foreign Application Priority Data

May 28, 1985 [IT] Italy ................. 20915 A/85

[51] Int. Cl.$^5$ ........................................... G06F 15/20
[52] U.S. Cl. ..................................... 364/480; 328/11; 219/497
[58] Field of Search .................. 364/480, 481, 557; 324/128; 328/146, 147, 11; 307/354, 355, 364, 529, 549, 551; 330/69; 219/494, 497, 499

[56] References Cited

U.S. PATENT DOCUMENTS

| | | | |
|---|---|---|---|
| 3,493,782 | 2/1970 | Georgi | 328/146 |
| 3,922,535 | 11/1975 | Randolph | 364/557 X |
| 4,008,387 | 2/1977 | Green et al. | 364/477 |
| 4,079,331 | 3/1978 | Pinckaers et al. | 219/499 X |
| 4,167,663 | 9/1979 | Granzow, Jr. et al. | 219/479 |
| 4,414,638 | 11/1983 | Talambiras | 364/481 X |
| 4,463,272 | 7/1984 | Tucker | 328/147 X |
| 4,484,295 | 11/1984 | Bedard et al. | 364/480 X |
| 4,554,439 | 11/1985 | Cross et al. | 219/497 |
| 4,591,994 | 5/1986 | Washizuka et al. | 364/477 X |
| 4,599,572 | 7/1986 | Nakayama | 330/69 |
| 4,612,463 | 9/1986 | Kikuchi | 328/147 X |
| 4,634,892 | 1/1987 | Isbell et al. | 307/355 X |
| 4,644,138 | 2/1987 | Walsh | 219/497 X |
| 4,692,598 | 9/1987 | Yoshida et al. | 219/497 |

FOREIGN PATENT DOCUMENTS 0783749 11/1980 U.S.S.R. .............................. 364/480

OTHER PUBLICATIONS

Cichocki, C., O. Osowski, "Realization of Resistive N-Port Networks Using Operational Amplifiers", *Electronics Letters*, vol. 14, No. 13, Jun. 22, 1978, pp. 412-414.

Primary Examiner—Joseph L. Dixon
Attorney, Agent, or Firm—Morgan & Finnegan

[57] ABSTRACT

An interface circuit to the output of a programmable voltage ramp generator for decreasing the minimum voltage step of such a generator having two voltage channels and a minimum voltage step greater than 1 millivolt. The interface circuit receives an input from each of the two voltage channels ($V_2$, $V_3$), along with an inserted voltage ($V_1$). The circuit includes a summing amplifier for (i) compressing the minimum voltage step from one voltage channel ($V_2$) by a factor equal to or greater than such minimum voltage step, (ii) adding the voltage from the other channel ($V_3$) to the compressed voltage, and (iii) subtracting the inserted voltage ($V_1$) (or adding an inserted voltage which is negative). The inserted voltage ($V_1$) is equal in magnitude to the maximum output value from the voltage channel that has the voltage compressed ($V_2$). The output of the summing amplifier ($V_{out}$) may be represented by:

$$V_{out} = (V_3/X) + (V_2/Y) + (V_1/Z)$$

where X, Y, Z = attenuation or amplication factors. The interface circuit decreases the minimum voltage step at channel $V_2$ by a factor Y down to a minimum voltage step of 1 millivolt or less.

6 Claims, 2 Drawing Sheets

PROGRAMMABLE - VOLTAGE - GENERATOR INTERFACE FOR DECREASING THE MINIMUM VOLTAGE STEP

This is a continuation of co-pending application Ser. No. 06/867,024, filed on May 27, 1986 now abandoned.

FIELD OF INVENTION

This invention relates to electronic devices for use with conventional programmable voltage generators and more particularly to such devices which reduce the minimum voltage step to 1 millivolt or less.

BACKGROUND OF INVENTION

The conventional programmable voltage generator has a minimum voltage step of approximately 10–20 millivolts. Such a minimum voltage step is too large for voltage inputs to a temperature controller used with ovens for growing monocrystals.

Temperature controllers for ovens used in growing crystals may require temperature control of some tenths of a degree centigrade. A minimum voltage step of 1 millivolt or less typically would be needed to achieve a temperature variation of 0.1° C. or less. Thus, the minimum voltage step of approximately 10–20 millivolts is a drawback against using a conventional programmable-voltage-generator to provide a voltage input to a temperature controller for ovens used in growing crystals.

One conventional programmable voltage generator is the Honeywell DCP 7700. Analagous generators are available from Leeds, Northrup, Eurothon and other companies. The oven generally used in the growth of monocrystals is the CZ type (Czochralski) oven. Horizontal Bridgman type ovens also are used. The growth technique generally used is the LEC technique.

The Honeywell programmable voltage ramp generator has the following characteristics: voltage outputs on 3 independent channels, capability of programming 99 temperature segments or settings, and storing of 9 programs. The nine programs define the voltage variation from an initial predetermined voltage value to a final value, while passing through intermediate values in established periods of time that are more or less prolonged.

A problem with the conventional generators is the characteristic of a minimum voltage step of approximately 10–20 millivolts. Such voltages correspond to minimum programmable temperature variations of approximately 1° to 2° C. In particular, such a minimum temperature variation results in a high number of lattice defects in the growth of a semiconductor type insulating or metallic crystal. These defects make the monocrystals obtained rather unsuitable for various applications, in particular for those in the electronics field (i.e. emitter diodes, microwave devices, lasers, integrated circuits). The Group III-V monocrystals (i.e. GaP and InP) result in a high dislocation density and often a high concentration of impurities. Such monocrystals are not stoichiometric and have a low structural homogeneity. Inclusions, microprecipitates, etc., may be present. This represents a significant drawback when the monocrystals are prepared by using a polycrystal as a precursor because the monocrystal will have a high number of dislocation and impurity defects.

Another drawback with a 1° C. to 2° C. (i.e. 10 mv to 20 mv) minimum step is that the high concentration of defects is also associated with a concentration of contaminating impurities which in turn generally contribute to the formation of lattice defects during the growth and cooling of the monocrystal.

To achieve a high perfection (instead of a high dislocation density) and a high purity (instead of impurity) in a monocrystal, it is necessary to have temperature variations down to 0.1° C. or less in certain stages of the growth cycle.

Therefore, there is a need for special programmable generators capable of programming voltage variations of about 1 mV or less to enable the growth of monocrystals with a high perfection and purity.

By using the interface circuit of this invention with a conventional programmable voltage generator, it is possible to achieve such minimum voltage steps of 1 millivolt or less.

SUMMARY OF THE INVENTION

An object of this invention is to provide an interface circuit between a programmable voltage ramp generator and a temperature controller for decreasing the minimum voltage step.

The programmable voltage ramp generator has two output voltage channels CH2 and CH3 for voltage signals $V_2$ and $V_3$, respectively, which are variable between a minimum and a maximum and increasable by minimum values greater than 1 millivolt.

The interface circuit has three input voltages $V_1$, $V_2$, and $V_3$. $V_2$ and $V_3$ are the voltage signals output from the programmable voltage ramp generator. $V_1$ is an inserted voltage. The output voltage, $V_{out}$, of the interface circuit has minimum voltage steps $\leq 1$ millivolt.

$$V_{out} = V_3 + (V_2/Y) + V_1 \qquad (1)$$

where $Y$ = attenuation factor $V_{out}$ is obtained by compressing the minimum output voltage variation from the generator channel CH2 by an attenuation factor Y, adding the output voltage of generator channel CH3, and adding an inserted voltage $V_1$ (which is a negative voltage).

The attenuation factor Y is equal to or greater than the minimum voltage step of channel CH2. The inserted voltage, $V_1$, equals the maximum output value of channel CH2 (but of the opposite polarity).

In particular, the interface circuit includes a summing amplifier having an output voltage, $V_{out}$, defined by the equation:

$$V_{out} = (V_3/X) + (V_2/Y) + (V_1/Z) \qquad (2)$$

where
$X$ = an attenuation or amplification factor
$Y \geq$ minimum voltage step of CH2
$Z$ = an attenuation or amplification factor To achieve equation (1) for $V_{out}$ of the interface circuit, $X = Z = 1$.

DETAILED DESCRIPTION OF A PREFERRED EMBODIMENT

Figure 1:
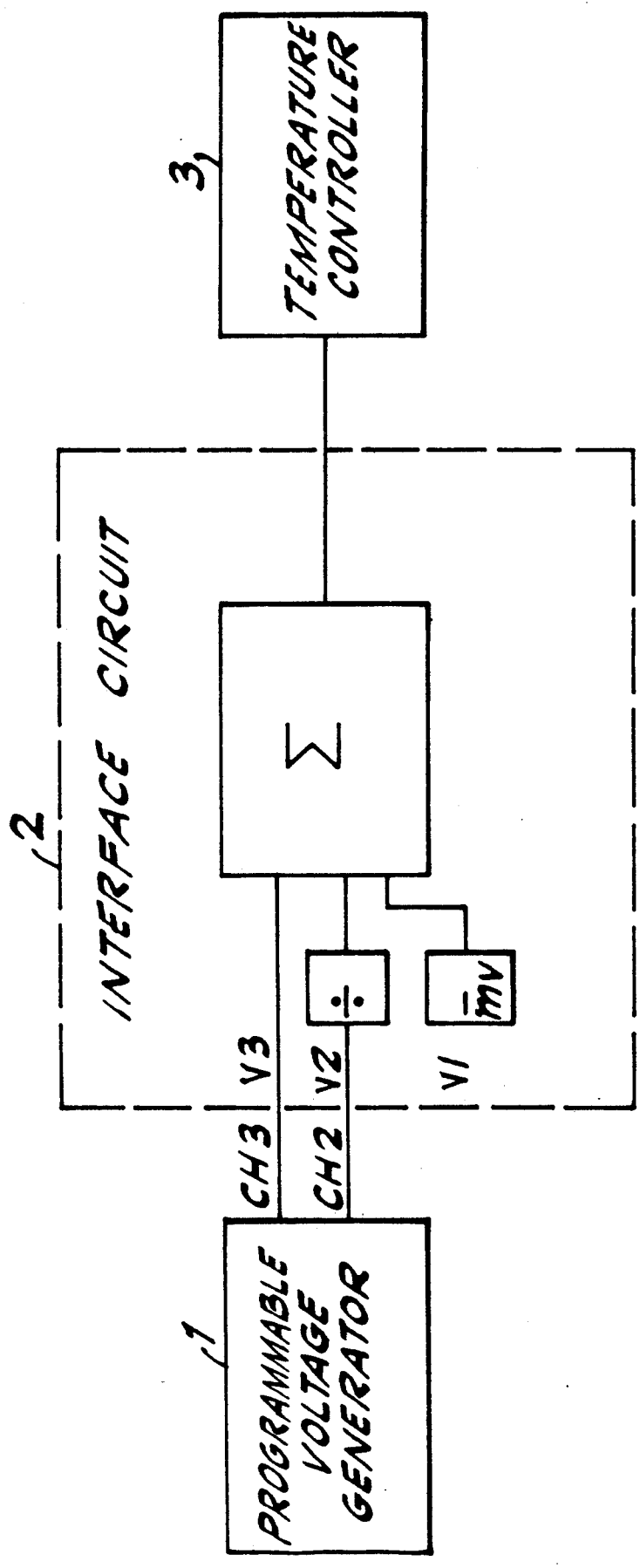
FIG. 1 is a block diagram of the interface circuit of this invention between a programmable voltage generator and a temperature controller.

FIG. 1 illustrates the block diagram of the interface circuit 2 between the programmable voltage generator 1 and the temperature controller 3. As illustrated, the voltage signal at channel CH3 is input to a summing circuit without being altered. The voltage signal at channel CH2, however, is shown to pass through a division circuit prior to being input to the summing circuit. In addition, a voltage $V_1$ is inserted as an input to the summing circuit. The voltage, $V_1$, is designated to be a negative voltage in millivolt units. The output of the interface circuit 2 enters the temperature controller 3.

Figure 2:
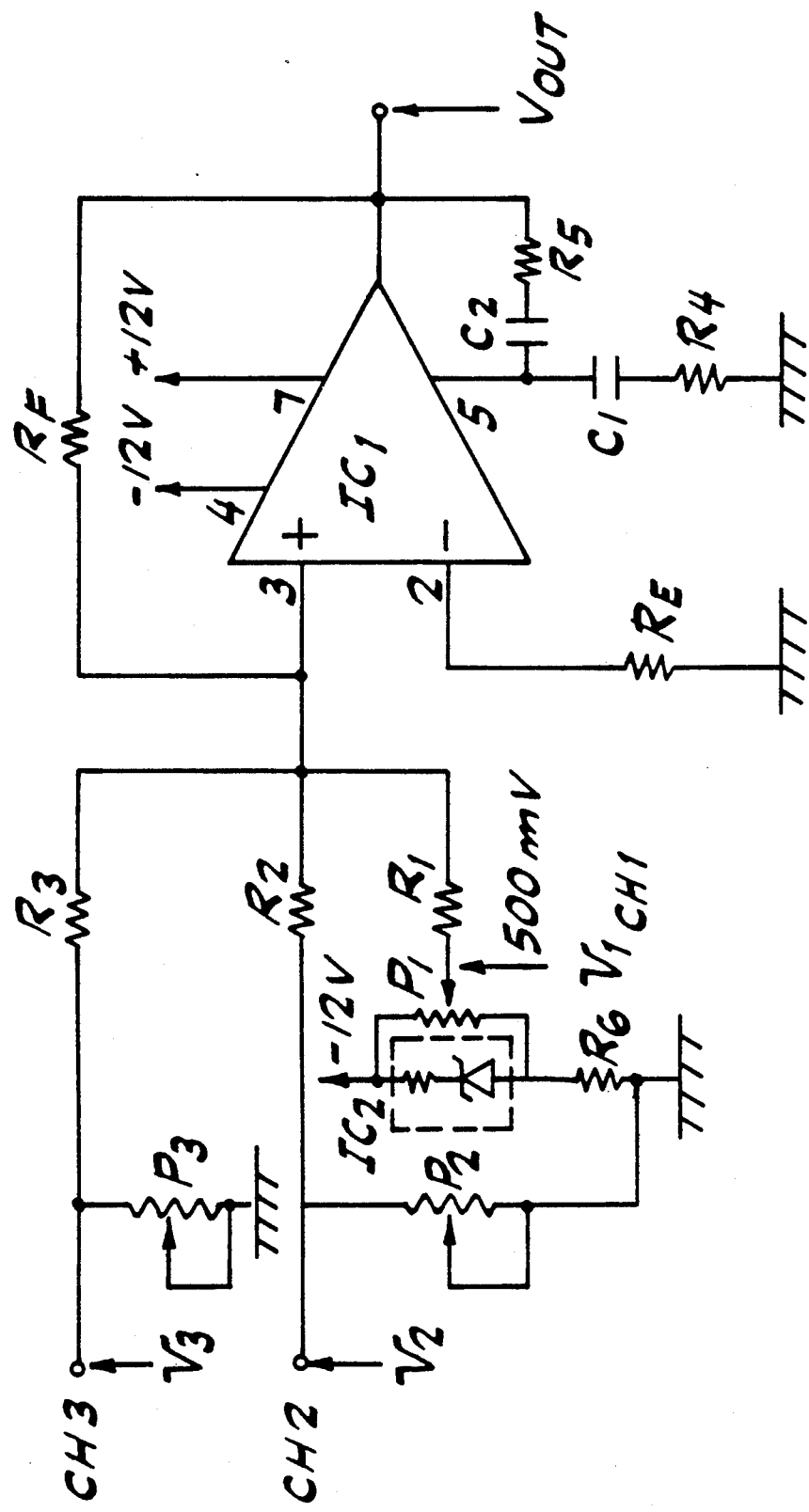
FIG. 2 is an electrical schematic of the preferred embodiment of the interface circuit of this invention.

Referring to FIG. 2, the summing circuit includes a summing amplifier.

The voltage signals $V_1$, $V_2$, and $V_3$ are defined as follows:

(1) $V_1$ is a negative voltage necessary for maintaining an output signal which fully compensates the output signal from channel CH2 of the programmable voltage generator 1 and the intrinsic output signal of the summing amplifier. $V_1$ may be attenuated or amplified by a factor Z as a function of the reciprocal of the resistors $R_1$ and $R_F$ as configured in FIG. 2. As also shown in FIG. 2, $V_1$ is stabilized by a Zener diode.

(2) $V_2$ is the output voltage at channel CH2 of the programmable voltage generator. $V_2$ varies between a minimum and a maximum value and has a minimum voltage step greater than 1 millivolt, all as defined by the programmable voltage generator 1. $V_2$ is attenuated by a factor Y as a function of the reciprocal of the resistors $R_2$ and $R_F$ and may be increased in steps of less than or equal to 1 millivolt over the range of $V_2$ as attenuated.

(3) $V_3$ is the output voltage at channel CH3 of the programmable voltage generator. $V_3$ varies between a minimum and a maximum with minimum voltage steps greater than 1 millivolt, all as defined by the programmable voltage generator 1. $V_3$ is attenuated or amplified by a factor X as a function of the reciprocal of the resistors $R_3$ and $R_F$.

The amplification or attenuation factors X, Y, Z are selected such that $V_2$ is attenuated, such that $V_1$ and $V_3$ are amplified, attenuated or left unchanged, and such that $V_{out}$ has a minimum voltage step of less than or equal to 1 millivolt.

An example is provided below of a particular application of the interface circuit 2 for the growth and synthesis of monocrystals with a CZ ADL oven model HPCZ, a Honeywell DCP7700 programmable voltage generator, and a CAT series 80 temperature controller. In such cases the values of $V_1$, $V_2$, and $V_3$ for achieving minimum voltage steps of 1 millivolt are:

(1) $V_1$ is approximately $-500$ millivolts and stabilized by a Zener diode to maintain an output signal which fully compensates (i) a 500 millivolt maximum signal provided by channel CH2 and (ii) the intrinsic output signal of the amplifier. Resistor $R_1$ is set equal to $R_F$ such that attenuation factor $Z=1$.

(2) $V_2$ is variable between 1 volt and 5 volts with minimum increases of 10 millivolts for the Honeywell DCP7700 programmable voltage generator. Resistor $R_2$ is selected to be equal to $R_F$ times 10 to achieve an attenuation factor of 10 ($Y=10$). $V_2$ provides output variations between 100 millivolts (1 volt/Y) and 500 millivolts (5 volts/Y) with a minimum voltage step of 1 millivolt (10 millivolts/Y).

(3) $V_3$ also is variable between 1 volt and 5 volts with minimum voltage increases of 10 millivolts for the Honeywell DCP7700 programmable voltage generator. Resistor $R_3$ is selected to equal $R_F$ such that the attenuation factor X equals 1.

For the growth phase of monocrystals, controlled temperature drops between 0.1° C. and 40° C. in 0.1° C. steps may be achieved with $V_1$, $V_2$, and $V_3$ defined as above with the respective attenuation factors ($X=1$, $Y=10$, $Z=1$).

By fixing $V_2$ at 5 volts, the contribution of $V_1$ and $V_2$ to the output voltage is zero (i.e. $(5000/10)-500=0$). Then by varying $V_2$ at the programmable voltage generator from 5 volts down to 1 volt in 10 millivolt steps, the output voltage from the interface circuit varies from 0 volts to $-400$ millivolts in 1 millivolt steps (before adding $V_3$). By adding $V_3$, the minimum output voltage may be offset as needed (i.e. during the synthesis phases of the polycrystal starting from the elements for semiconductors obtained with the LEC technique).

In such an example, the interface circuit performs the following functions:

compress (divide) by a factor of 10 the minimum voltage step of channel 2 bringing the minimum voltage step to a value of 1 millivolt;

add the output voltage of channel 3, unchanged, to the compressed voltage of channel 2;

add the negative 500 millivolts, $V_1$, to the total output at channel 2 to bring the operating range of channel 2 between 0 and $-0.4$ volts.

The output voltage of the interface circuit is defined in such case by the equation:

$$V_{out} = V_3 + (V_2/10) - 500 \tag{3}$$

As illustrated in FIG. 2, a preferred embodiment of the interface circuit is shown.

CH2 and CH3 are the output channels from a conventional programmable voltage generator. $R_1$, $R_2$, $R_3$, $R_4$, $R_5$, $R_E$, and $R_F$ are resistors. $C_1$ and $C_2$ are capacitors. $P_1$, $P_2$, and $P_3$ are variable resistors (potentiometers), the maximum values for which are labelled in FIG. 2.

$IC_1$ is a summing amplifier (i.e. National A725).

$IC_2$ is an integrated circuit including a zener diode and resistor. The values for the example above are defined below:

$R_1 = R_3 = R_F = 10$ kilo-ohms
$R_2 = 100$ kilo-ohms
$R_E = 3.9$ kilo-ohms
$R_4 = 10$ ohms
$R_5 = 39$ ohms
$P_3(max) = P_2(max) = 500$ ohms
$P_1(max) = 10$ kilo-ohms
$R_6 = 12$ kilo-ohms
$C_1 = 0.05$ micro-farads
$C_2 = 0.02$ micro-farads It is understood that based on the teachings above one skilled in the art may redefine the values assigned above to attenuate or amplify the voltages $V_1$ and $V_3$ and to alter the attenuation of voltage $V_2$ to obtain an output voltage, $V_{out}$, still having a minimum voltage step of less than or equal to 1 millivolt.

In one example of the interface with the component values defined as above, a 500 gram monocrystal of InP is melted in a CZ ADL type oven, mod. HPCZ at 1100°

C. Voltage variations then are applied to a Honeywell DCP7700 programmable voltage generator. It is observed that for output voltage variations of 1 millivolt there is a corresponding melt temperature variation of approximately 0.1° C. The temperature is measured using precision thermocouples for high temperatures of the Platinum/Platinum-Rhodium type (13%).

In comparison, under the same conditions absent the interface circuit, the minimum voltage variation is 10 millivolts and the minimum temperature variation observed is 1° C.

What is claimed is:

1. An interface circuit between a programmable voltage generator providing two channels variable between a minimum voltage and a maximum voltage by increments of greater than one millivolt and a temperature controller, comprising:
   means for obtaining a compressed voltage by dividing a first voltage from the programmable voltage generator by an attenuation factor equal to or greater than the minimum voltage increment for said first voltage;
   means for obtaining a summed voltage by adding a second voltage from the programmable voltage generator to said compressed voltage; and
   means for adding an inserted voltage equal in magnitude and opposite in polarity to the maximum voltage for said first voltage to said summed voltage;
   wherein the interface circuit provides incremental voltage changes for temperature control to the temperature controller of less than one millivolt responsive to incremental voltage changes from the programmable voltage generator of greater than one millivolt.

2. An interface circuit according to claim 1, further including a summing amplifier having three input voltages, $V_1$, $V_2$ and $V_3$, and an output voltage $V_{out}$ defined by the equation:

$$V_{out} = V_3 + V_2/Y + V_1$$

where $V_2$ and $V_3$ are the first and second voltages from the programmable voltage generator, Y is the attenuation factor, and $V_1$ is the inserted voltage.

3. An interface circuit according to claim 1, further including a summing amplifier having three input voltages, $V_1$, $V_2$, and $V_3$, and an output voltage $V_{out}$ defined by the equation:

$$V_{out} = (V_3/X) + (V_2/Y) + (V_1/Z)$$

where $V_2$ and $V_3$ are the first and second voltages from the programmable voltage generator, Y is the attenuation factor, $V_1$ is the inserted voltage, and X and Z are attenuation or amplification factors, and wherein X, Y, and Z are defined to achieve a minimum voltage step for $V_{out}$ of less than or equal to 1 millivolt.

4. An interface circuit between a programmable voltage generator providing two channels variable between a minimum voltage and a maximum voltage by increments of greater than one millivolt and a voltage-responsive temperature-controlled oven for growing monocrystals, comprising:
   means for obtaining a compressed voltage by dividing a first voltage from the programmable voltage generator by an attenuation factor equal to or greater than the minimum voltage increment for said first voltage;
   means for obtaining a summed voltage by adding a second voltage from the programmable voltage generator to said compressed voltage; and
   means for adding an inserted voltage equal in magnitude and opposite in polarity to the maximum voltage for said first voltage to said summed voltage to obtain a temperature-control voltage;
   wherein the interface circuit provides incremental voltage changes in the temperature-control voltage to the voltage-responsive temperature-controlled oven of less than one millivolt responsive to incremental voltage changes from the programmable voltage generator of greater than one millivolt.

5. An interface circuit according to claim 4, further including a summing amplifier having three input voltages, $V_1$, $V_2$ and $V_3$, and an output voltage $V_{out}$ defined by the equation:

$$V_{out} = V_3 + V_2/Y + V_1$$

where $V_2$ and $V_3$ are the first and second voltages from the programmable voltage generator, Y is the attenuation factor, and $V_1$ is the inserted voltage.

6. An interface circuit according to claim 4, further including a summing amplifier having three input voltages, $V_1$, $V_2$, and $V_3$, and an output voltage $V_{out}$ defined by the equation:

$$V_{out} = (V_3/X) + (V_2/Y) + (V_1/Z)$$

where $V_2$ and $V_3$ are the first and second voltages from the programmable voltage generator, Y is the attenuation factor, $V_1$ is the inserted voltage, and X and Z are attenuation or amplification factors, and wherein X, Y, and Z are defined to achieve a minimum voltage step for $V_{out}$ of less than or equal to 1 millivolt.

* * * * *